United States Patent [19]
Hamanaka et al.

[11] Patent Number: 5,121,254
[45] Date of Patent: Jun. 9, 1992

[54] IMAGE TRANSMITTING ELEMENT AND PROCESS FOR PRODUCING PHOTO-SHIELD SPACER PLATE USED THEREIN

[75] Inventors: Kenjiro Hamanaka; Kenzo Sono; Takashi Kishimoto, all of Osaka, Japan

[73] Assignee: Nippon Sheet Glass Co., Ltd., Osaka, Japan

[21] Appl. No.: 611,602

[22] Filed: Nov. 13, 1990

[30] Foreign Application Priority Data

Nov. 16, 1989 [JP] Japan ................................. 1-297958

[51] Int. Cl.⁵ ............................................. G02B 13/24
[52] U.S. Cl. .................................. 359/619; 359/620; 359/738
[58] Field of Search ............... 350/167, 319, 448, 449, 350/450; 250/237 R; 355/33, 34

[56] References Cited

U.S. PATENT DOCUMENTS

| | | | |
|---|---|---|---|
| 3,426,147 | 2/1969 | McNaney | 350/167 |
| 3,716,445 | 2/1973 | Lemelson | 350/167 |
| 3,739,173 | 6/1973 | Broussaud | 350/167 |
| 3,827,783 | 8/1974 | Lemelson | 350/167 |
| 4,156,555 | 5/1979 | McMahon | 350/167 |
| 4,402,572 | 9/1983 | Tsunoda et al. | 350/167 |
| 4,611,124 | 9/1986 | Schneider | 350/167 |

Primary Examiner—Bruce Y. Arnold
Assistant Examiner—Martin Lerner
Attorney, Agent, or Firm—Sughrue, Mion, Zinn Macpeak & Seas

[57] ABSTRACT

An image transmitting element and process for producing a photo-shield spacer plate used for the image transmitting element are disclosed. The image transmitting element comprises: a lens array plate comprising micro-lenses one-dimensionally or two-dimensionally formed as an array on a transparent substrate; and a photo-shield spacer plate joined with the lens array plate on one surface thereof, the photo-shield spacer plate comprising an array of photo-transmissible holes formed therein each corresponding to the micro-lenses, respectively, at least a part or the whole of an inner wall of each of the photo-tranmissible holes being a photo-absorptive surface, the photo-shield spacer plate comprising a pair of members each having grooves each forming a longitudinally divided half of the respective photo-transmissible holes, the pair of members being joined and contact with each other so that the grooves of one of the pair of members are made to accord with the grooves of the other of the pair of members so as to form the photo-transmissible holes.

4 Claims, 4 Drawing Sheets

IMAGE TRANSMITTING ELEMENT AND PROCESS FOR PRODUCING PHOTO-SHIELD SPACER PLATE USED THEREIN

FIELD OF THE INVENTION

The present invention relates to an image transmitting element for optically transmitting and focusing one-dimensional image information, and particularly relates to an image transmitting element which is useful for transmitting and focusing an image of an original document onto a contact type image sensor in a copying machine, a facsimile, an image scanner, or the like, or transmitting and focusing a light signal from a luminous body array onto a photosensitive drum in an LED printer or the like.

BACKGROUND OF THE INVENTION

A lens array (hereinafter abbreviated as "SLA") constituted by a number of parabolic refractive index distributing rod lenses which are arrayed to make their optical axes parallel has been used widely to focus one-dimensional image information on the surface of an original document onto a contact type image sensor.

Recently, it has been preferred to use a so-called "perfect contact type image sensor" which is constituted by a contact type image sensor having light leading windows, so that an illuminating light source placed at the back side of this image sensor illuminates an original document though the light leading window, and an array of photo-detecting portions disposed close to the light leading windows detect reflected light from the original document. In such a case, the contact sensor and the original document are disposed so close without using an SLA.

More recently, an optical system of a "semi-perfect contact type" which is considered as an intermediate between an SLA and a perfect contact type has been proposed (*Extended Abstracts of the 35th Spring Meeting* 1988, The Japan Society of Applied Physics, No. 3, page 753, published on Mar. 28, 1988). In this optical system, an image is focused by polymer micro-lenses for every picture element of a contact sensor, by using a combination of a polymer micro-lens array and a photo-shield spacer.

On the other hand, in an LED or liquid crystal printer, an SLA has been used to transmit, onto a photosensitive drum, light information expressed by the flashing of an LED array or the switching of a liquid crystal shutter array.

However, an SLA needs at least about 15 mm as a so-called focal length between a one-dimensional image information surface and a focusing surface, so that this value is a limit to miniaturizing an apparatus using the SLA.

On the other hand, since the perfect contact type image sensor has no focusing system such as a lens or the like, there has been a problem that image information is faded on an image sensor if the distance between the image sensor and an original document becomes even slightly large. It is therefore necessary to maintain the sensor surface always in contact with an original document, so that there has been a problem that the sensor surface is apt to be damaged.

Further, a photo-shield spacer in the semi-perfect contact type optical system is formed by overlaying ten stainless steel plates of about 50 μm thick in which very small holes are made by chemical etching, so producing such a photo-shield spacer is extremely troublesome.

SUMMARY OF THE INVENTION

It is therefore an object of the present invention to solve the foregoing problems in the prior art.

It is another object of the present invention to improve elements used for transmitting an image in an above-mentioned semi-perfect contact type optical system.

The present invention relates to an image transmitting element comprising: a lens array plate comprising micro-lenses one-dimensionally or two-dimensionally formed as an array on a transparent substrate; and a photo-shield spacer plate joined with the lens array plate on one surface thereof, the photo-shield spacer plate comprising an array of photo-transmissible holes formed therein each corresponding to the micro-lenses, respectively, at least a part or the whole of an inner wall of each of the photo-transmissible holes being a photo-absorptive surface, the photo-shield spacer plate comprising a pair of members each having grooves each forming a longitudinally divided half of the respective photo-transmissible holes, the pair of members being joined and contact with each other so that the grooves of one of the pair of members are made to accord with the grooves of the other of the pair of members so as to form the photo-transmissible holes.

The photo-shield spacer plate having such a structure with divided halves can be mass-produced accurately and inexpensively by the process which will be described in the following.

The present invention also relates to a process for producing the photo-shield spacer plate used in the above-mentioned image transmitting element, which process comprises the steps of: providing one surface of each of a pair of substrates with an anti-corrosive mask film; forming an array of slit apertures in parallel to each other in the mask film; contacting an etching material to the surface of the substrate on which the mask film is provided so as to etch the surface of the substrate isotropicaly from the slit apertures to thereby form grooves each having an substantially semi-cylindrical shape; removing the mask film; forming a photo-absorptive coating on at least a part or the whole of an inner wall surface of each of the grooves; joining the pair of grooved substrates in a manner so that the grooves of one of the pair of grooved substrates are made to accord with the grooves of the other of the pair of grooved substrates so as to form photo-transmissible holes; and cutting the joined body of the pair of grooved substrates to a width corresponding to a desired thickness of the photo-shield spacer plate along cutting lines perpendicular to the grooves.

Accordingly, in one embodiment of the present invention, one surface of a glass plate is firstly coated with a mask film composed of an anti-corrosive material. In this mask film, a number of slit-shaped apertures of very small width are formed in advance in parallel to each other with the same array pitch as that of micro-lenses in a lens array plate, that is, that of a sensor or LED array.

When this masked surface contacts an etching liquid, the substrate surface is etched and removed in semi-circular shapes in section centering the above-mentioned apertures. After formation of the glass plate in which a number of semi-cylindrical grooves having almost the same diameter as that of the micro-lenses of the lens array plate are arranged at predetermined intervals, the inner walls of the grooves are subject to required photo-absorptive surface making processing. Two sheets of such grooved glass plates are joined with each other so that their grooves are opposite to each other respectively and correspondingly, and the joined plates are cut in a predetermined width corresponding to a required spacer thickness. Thus, the image transmitting element according to the present invention is obtained.

By using such an image transmitting element according to the present invention in combination with an image sensor or an LED array, it is possible to correctly transmit one-dimensional image information on an original document onto an image sensor array in a contact type image sensor, or one-dimensional information of light intensity from an LED array onto a photosensitive drum in an LED printer.

Other features and advantages of the present invention will be apparent from the following description taken in connection with the accompanying drawings, wherein:

DETAILED DESCRIPTION OF THE PREFERRED EMBODIMENT

An embodiment of the present invention will be described in detail with reference to the drawings.

Figure 1:
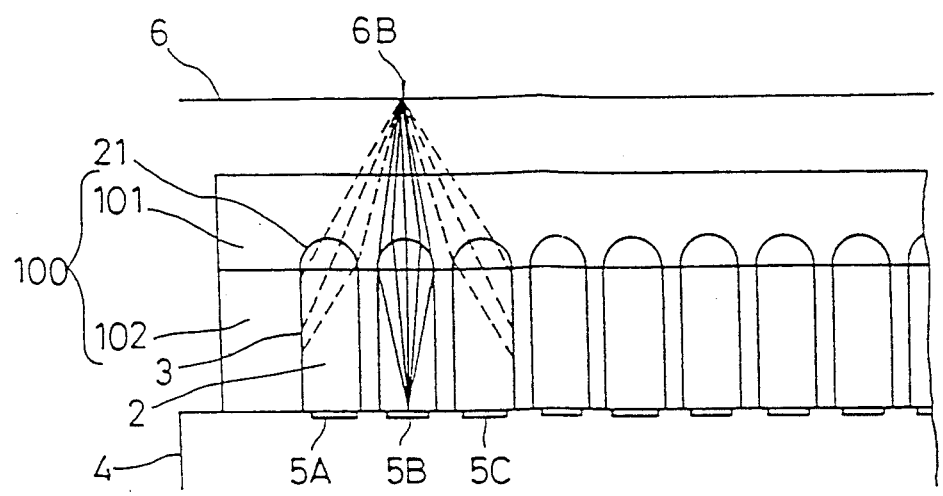
FIG. 1 is a longitudinal sectional view illustrating an embodiment of the application of an element according to the present invention to an image reading apparatus.
Figure 2:
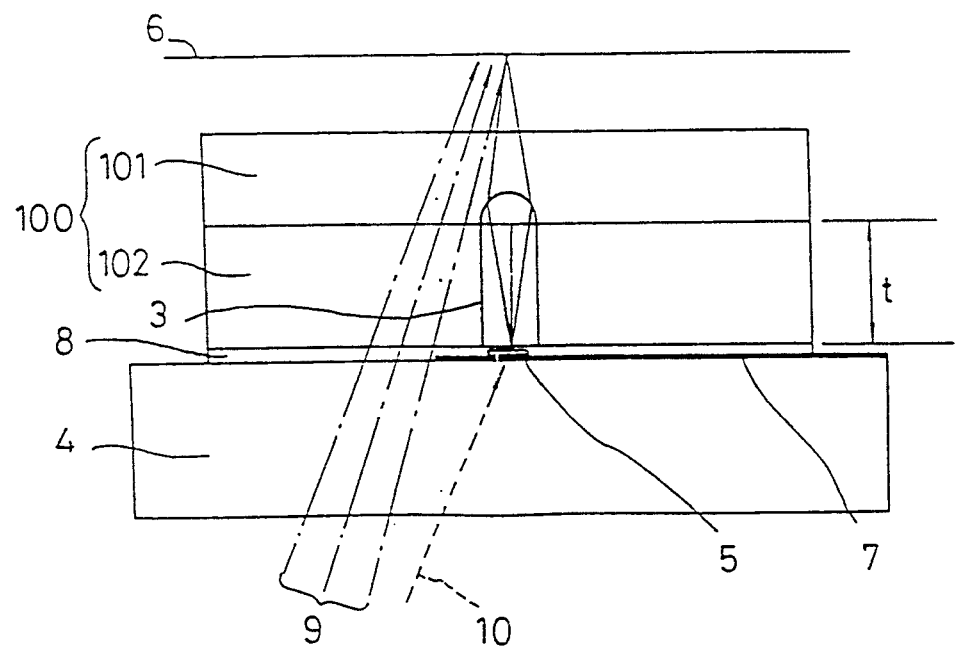
FIG. 2 is a transversal sectional view illustrating the same.
Figure 3:
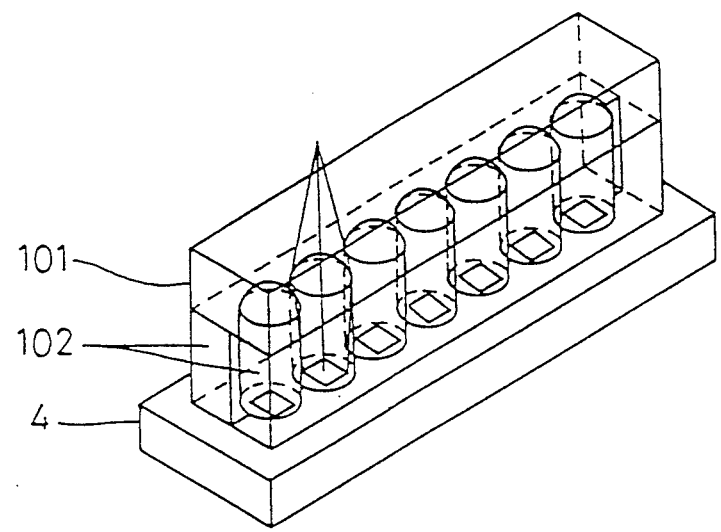
FIG. 3 is a perspective view illustrating the same.
Figure 4:
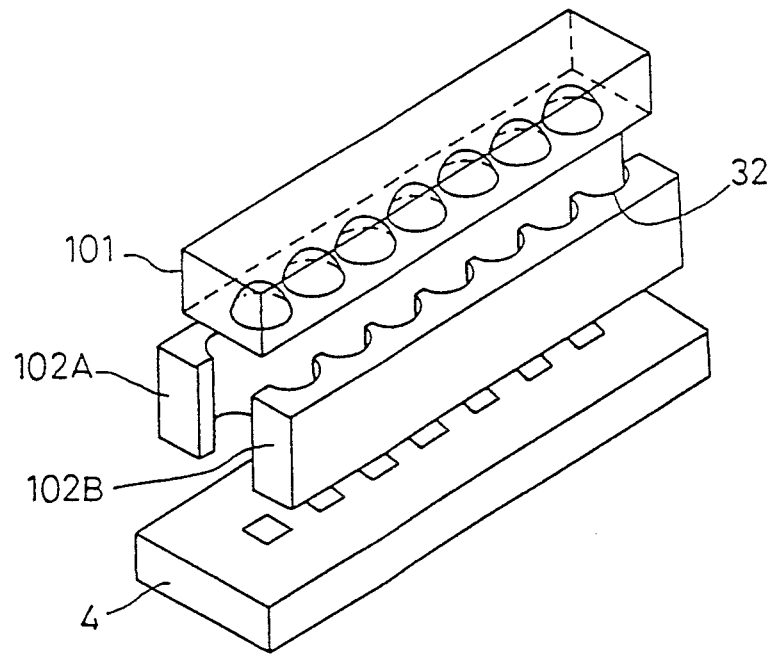
FIG. 4 is an exploded perspective view illustrating respective constituents in FIG. 3.

FIGS. 1 to 4 show an embodiment of the image transmitting element according to the present invention in the case where the image transmitting element is applied to a contact type image sensor. FIG. 1 is a longitudinal sectional view; FIG. 2 is a transversal sectional view; FIG. 3 is a perspective view; and FIG. 4 is an exploded perspective view showing the state in which parts are separated.

In the drawings, an image transmitting element 100 according to the present invention is generally constituted by a lens array plate 101 and a photo-shield spacer plate 102.

The lens array plate 101 is constituted by a transparent substrate of, for example, glass (e.g., alkali-free glass, quartz glass, soda-lime glass), plastic (e.g., UV or heat curable acrylic resins, polymethyl methacrylate, polycarbonate), or the like, in which a number of micro-lenses 21 constituted by substantially semi-spherical regions of a refractive index higher than that of their surroundings are arrayed one-dimensionally at predetermined intervals in the one surface thereof. Such a lens array plate may be produced by a conventional ion exchange method, a monomer dispersing method, or the like.

The photo-shield spacer plate 102 preferably comprises a transparent material and has a number of photo-transmissible holes 2. These photo-transmissible holes 2 are cylindrical and have almost the same diameter as that of the micro-lenses 21, and are arrayed one-dimensionally at the same intervals as those of the micro-lenses so that the respective holes 2 have one-to-one correspondence to the micro-lenses 21.

The inner walls of the respective holes 2 are coated with black paint 3 so as to absorb an unnecessary part of the light incident to these holes, that is, unnecessary part of the illuminating light reflected from the surface of an original document.

At least a part or the whole of the interiors of the photo-transmissible holes 2 may be left as they are as hollow spaces or may be filled with a transparent solid material such as light or heat curable acrylic resins, epoxy resins and the like.

As shown in FIG. 4, the photo-shield spacer plate 102 is divided into two symmetric members 102A and 102B by one boundary plane including the central axial lines of all the photo-transmissible holes 2.

That is, the members 102A and 102B each having semi-cylindrical grooves arrayed in its one surface side at the predetermined intervals are joined with each other through an adhesive agent or the like in a manner so that the grooves of one of the members 102A and 102B are opposite to the corresponding grooves of the other one of the members 102A and 102B to thereby constitute the photo-shield spacer plate 102.

The element 100 having the above-mentioned structure is bonded onto the surface of a contact type image sensor (hereinafter referred to as "contact sensor") 4 on the photo-shield spacer plate 102 side so that the positions of the respective photo-transmissible holes 2 are adjusted to accord with respective photo-detecting portions 5A, 5B, 5C, etc.

This integrated unit of the sensor and the image transmitting element is disposed so as to be opposite to the surface of an original document with a little distance therebetween so that the photo-detecting surface of the sensor thereto faces the surface of the original document. The contact sensor 4 is formed in a manner so that almost one half area of the surface of a transparent substrate is covered with a photo-shield layer 7 and photo-detecting portions 5 are one-dimensionally arrayed on the upper surface of and near the inner side edge of the photo-shield layer 7.

An illuminating light source is disposed at the back side of the contact sensor 4 so that an original document surface 6 is irradiated with illuminating light 9 through a non-photo-shield portion of the sensor substrate.

At this time, light rays 10 toward the photo-detecting portion 5 are cut by the photo-shield layer 7.

The reflected light from the original document surface 6 (rays illustrated by the solid lines in FIGS. 1 and 2) enters the photo-transmissible holes 2 in the photo-shield spacer plate 102 after passing the respective micro-lenses 21 in the lens array plate 101, and then are focusedly incident into the respective photo-detecting portions 5 in the contact sensor 4.

On the other hand, the light reflected and scattered from the original document surface 6 in the oblique direction (rays illustrated by the dotted lines in FIG. 1) is indeed incident into the adjacent photo-transmissible holes 2, but the inner walls of the photo-transmissible holes 2 have the photo-absorptive surfaces 3 so that the above-mentioned reflected and scattered light cannot reach any of the photo-detecting portion 5 of the contact sensor 4.

That is, the light (the rays illustrated by the solid lines in the FIGS. 1 and 2) which is reflected from each of the very small areas on the original document surface positioned just above the corresponding photo-detecting portion 5, for example, from an area 6B just above the corresponding photo-detecting portion 5B in FIG. 1, is incident into the corresponding photo-detecting portion 5B of the sensor efficiently through the convex lens effect of the corresponding micro-lens 21. On the contrary, the light (the rays illustrated by the dotted lines in FIG. 1) reflected and scattered obliquely in the direction to the other noncorresponding photo-detecting portions is intercepted by the black paint coating layers 3 on the walls of the respective photo-transmissible holes 2 after passing the adjacent micro-lenses so that the oblique light does not reach any of the photo-detecting portions of the sensor.

Consequently, respective portions in a one-dimensional area on the original document surface 6 have one-to-one correspondence to the respective photo-detecting portions 5 in the contact sensor 4 so as to realize clear one-dimensional image transmission with no cross talk light leaking to adjacent picture elements.

The reference numeral 8 in FIG. 2 represents an adhesive agent layer bonding the contact sensor 4 with the image transmitting element 100.

The other parts on the surface of the contact sensor such as a wiring pattern, a switching transistor (TFT), a surface protecting coating, etc. are omitted in the drawings for the sake of simplification.

A preferred embodiment of the process for producing the photo-shield spacer plate 102 will be described with reference to FIGS. 5 and 6.

Figure 5:
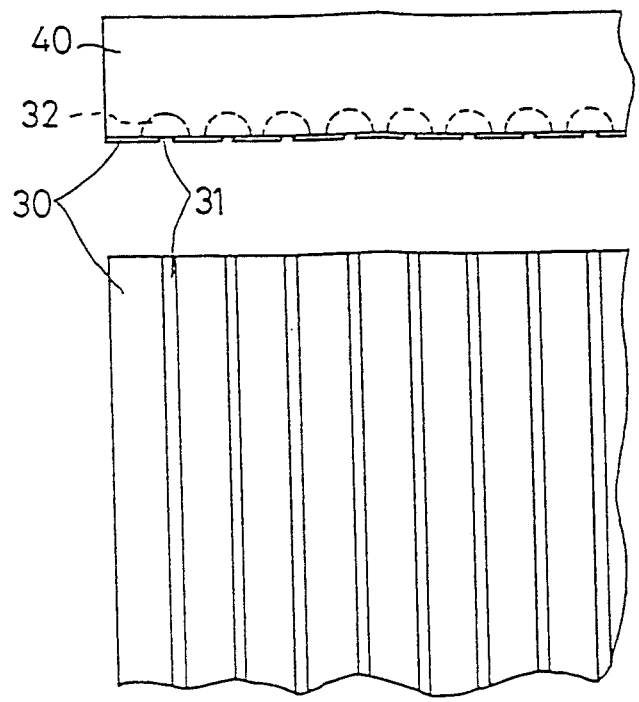
FIG. 5 is a sectional and plan views illustrating an embodiment of a process for producing a one member constituting a photo-shield spacer used in the present invention.
Figure 6:
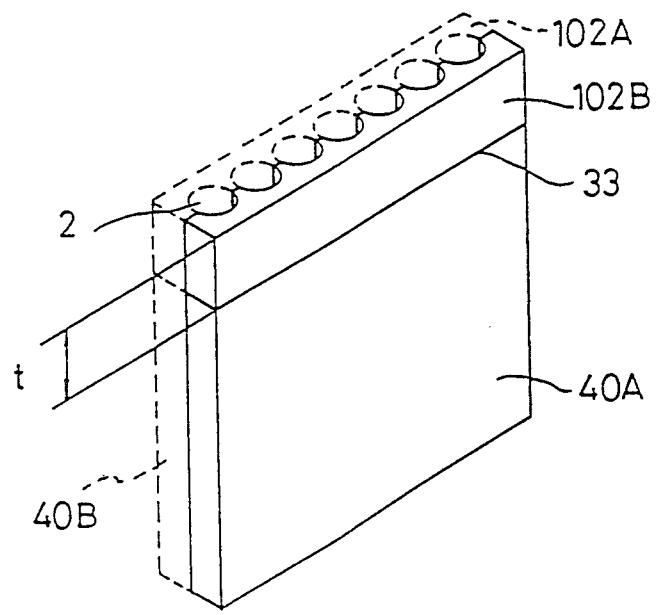
FIG. 6 is a perspective view illustrating a process for producing a photo-shield spacer by joining and cutting the grooved plates obtained by the process in FIG. 5.

First, as shown in FIG. 5, the surface of a glass substrate 40 is coated with a mask film 30 composed of a material such as Cr which is anti-corrosive against a glass etching liquid to be used in a later etching step, and in this mask film 30, a number of slit apertures 31 having a very small width are formed in parallel to each other at predetermined intervals by use of a well-known photo-lithographic process.

The intervals of these slit apertures 31 of the array are adjusted to accord with those of the micro-lenses 21 of the lens array plate 101.

By immersing the above-mentioned glass substrate 40 having the mask film into a glass etching liquid having a main component such as fluoric acid, etching starts from the slit apertures 31 in the mask film so that the glass substrate 40 is etched substantially isotropically from the surface of the glass substrate into the interior thereof and substantially semi-cylindrical grooves 32 are obtained as illustrated by the dotted lines in FIG. 5.

Next, after the mask film 30 has been removed by etching, the walls of the respective grooves 32 are coated with the black paint 3. This coating may be performed not only on the walls of the grooves but also on the whole surface of the glass substrate 40 per se. Therefore, the glass substrate 40 may be immersed into a black paint liquid tank or may be spray-coated with a black paint liquid. Instead of the black paint, carbon may be coated by sputtering.

Two grooved substrates obtained in the above-mentioned manner and having the same shape are bonded in a manner so that the grooves of one substrate are made to face and correctly positionally accord with the corresponding grooves of the other substrate.

If necessary, space portions surrounded by the opposite groove walls, that is, the inside of the photo-transmissible holes 2 may be filled with a transparent resin which is then hardened.

Next, the above-mentioned integrally joined body is cut and divided along a cutting line 33 perpendicular to axial lines of the grooves 32 by the width corresponding to the desired thickness t of the photo-shield spacer plate 102.

By the above-mentioned method, it is possible to mass produce, with high accuracy and inexpensively, the photo-shield spacer plate 102 which has the photo-transmissible holes 2 of extremely small diameter and the spacer thickness t larger than the diameter.

In the above-mentioned embodiment, the description has been made as to the case where a pair of grooved substrates are bonded and then cut, and the photo-shield spacer plate 102 is produced in advance before the substrates are joined to a lens array plate, but the photo-shield spacer plate 102 may be formed by a pair of the grooved substrate are bonded to the lens array plate while making the corresponding grooves face and contact with each other. That is, the order of formation may be selected optionally.

The micro-lenses 21 of the lens array plate 101 may be formed with curved surfaces projecting over the substrate surface.

It is preferred that the lens array plate 101 and the photo-shield spacer plate 102 have a thermal expansion coefficient the same as or substantially the same as that of a substrate material of the contact sensor 4.

For example, if the contact sensor 4 is made of #7059 glass (a trademark of Corning Co.) or quartz glass as its substrate, it is preferred that the same material is selected as the substrate material of the lens array plate 101 and the photo-shield spacer plate 102.

However, if high accuracy is not necessary, a transparent resin material (e.g., UV or heat curable acrylic resin, polymethyl methacrylate, polycarbonate) may be is used as the lens array plate 101 and the photo-shield spacer plate 102.

It is not always necessary to coat the whole length of photo-transmissible holes with the black paint 3, and, for example, there is a case where it is sufficient if only the area of the length about from 60% to 80% of the whole length of the holes is coated.

If illuminating light is radiated to an original document surface from the oblique direction, it is not necessary to make the photo-shield spacer plate 102 transparent, so that by using black ceramics material or the like, it is possible to realize the same photo-absorptive function without coating with black paint.

Although FIGS. 1 and 2 show that the micro-lenses 21 accurately focus an original document surface onto a photo-detecting portion of a sensor, it is sufficient if reflected light from the original document surface is incident into the area of the photo-detecting portion.

Figure 7:
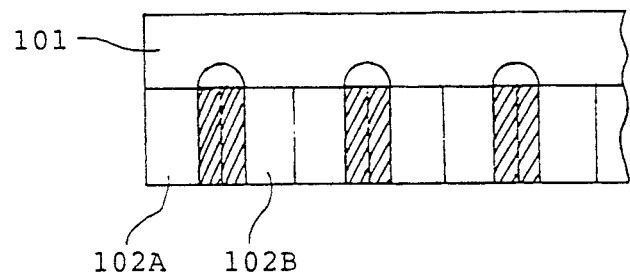
FIG. 7 is a transversal sectional view illustrating an embodiment of an element according to the present invention in which the micro-lenses are formed two-dimensionally.
Figure 8:
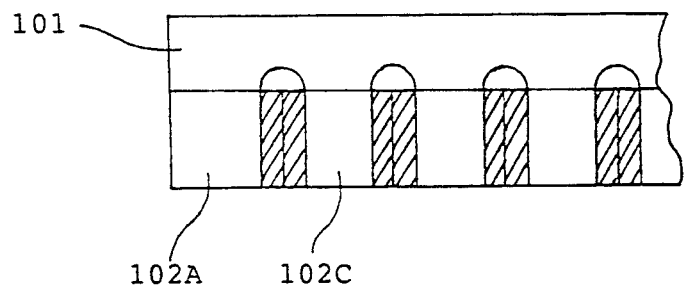
FIG. 8 is a transversal sectional view illustrating another embodiment of an element according to the present invention in which the micro-lenses are formed two-dimensionally.

The image transmitting element according to the present invention in which the micro-lenses and the photo-transmissible holes are formed two-dimensionally as an array can be produced by the methods described in FIGS. 7 and 8 but is not restricted thereto.

In one embodiment shown in FIG. 7, the photo-shield spacers each composed of a pair of members 102A and 102B produced by the above-described process are stacked along the longitudinal direction thereof to form a two-dimensional array of the photo-transmissible holes.

In another embodiment shown in FIG. 8, the photo-shield spacer is composed of a member having grooves on one surface thereof 102A and a number of a members each having grooves on both surfaces thereof 102C. In this embodiment, the intervals of the photo-transmissible holes can be reduced in comparison to the embodiment shown in FIG. 7.

Although the application to image information reading has been described in the above embodiment, the contact sensor 4 and the original document surface 6 may be replaced by a luminous body array such as an LED array and a photosensitive drum surface, respectively, to thereby constitute an image recording apparatus.

By use of an image transmitting element according to the present invention, it is possible to make an optical system such as a contact sensor, an LED printer and the like extremely small. For example, the distance between an original document surface and a light sensor surface becomes about from 0.6 to 2.0 mm.

At this time, even if there is a gap about not more than 1 mm between the original document surface and the image transmitting element, since light traveling in the direction toward the adjacent picture elements is intercepted by the light absorbing surfaces of the inner walls of the respective photo-transmissible holes in the photo-shield spacer plate, there is no fading of an image signal due to cross talk so that a clear image of high resolution can be obtained. That is, there are advantages that the depth of focus can be made comparatively large and that the surface is protected because of non-contact.

Moreover, although in a perfect contact type image sensor, the size of illuminating light leading windows corresponding to respective picture elements cannot be made large for the sake of keeping resolution so that the transmitting efficiency of the illumination to an original document surface becomes low, there is not such a limitation in the image transmitting element according to the present invention, and if the photo-shield spacer is made of a transparent member, for example, as shown in the embodiment in FIG. 2, it is possible to lead illuminating light to an original document from the back side of the image transmitting element 100 and the contact sensor 4 efficiently, so that it is possible to improve the utilization efficiency of illumination.

Further, in the image transmitting element according to the present invention, the photo-shield spacer has a halved structure and the photo-transmissible holes are formed so as to face the grooves provided in the respective surfaces of the pair of members, it is possible to produce a number of photo-shield spacers from one glass substrate at one time by an etching process as mentioned above, and it is possible to use an easy and mass-productive processing method, so that there is an advantage that production costs can be made reduced.

While the invention has been described in detail and with reference to specific examples thereof, it will be apparent to one skilled in the art that various changes and modifications can be made therein without departing from the spirit and scope thereof.

What is claimed is:

1. An image transmitting element comprising:
   a lens array plate comprising micro-lenses one-dimensionally or two-dimensionally formed as an array on a transparent substrate; and
   a photo-shield spacer plate joined with said lens array plate on one surface thereof, said photo-shield spacer plate comprising an array of photo-transmissible holes formed therein each corresponding to said micro-lenses, respectively, at least a part or the whole of an inner wall of each of said photo-transmissible holes being a photo-absorptive surface, said photo-shield spacer plate comprising a pair of members each having grooves each forming a longitudinally divided half of said respective photo-transmissible holes, said pair of members being joined and contact with each other so that said grooves of one of said pair of members are made to accord with said grooves of the other of said pair of members so as to form said photo-transmissible holes.

2. An image transmitting element as claimed in claim 1, wherein said photo-shield spacer plate comprises a transparent material.

3. A process for producing a photo-shield spacer plate said method comprising the steps of:
   (a) providing one surface of each of a pair of substrates with an anti-corrosive mask film;
   (b) forming an array of slit apertures in parallel to each other in said mask film;
   (c) contacting an etching material with the surface of said substrate on which said mask film is provided so as to etch the surface of said substrate isotopically form said slit apertures to thereby form grooves each having a substantially semicylindrical shape;
   (d) removing said mask film;
   (e) forming a photo-absorptive coating on at least a part or the whole of an inner wall surface of each of said grooves;
   (f) joining said pair of grooved substrates in a manner so that said grooves of one of said pair of grooved substrates are made to accord with said grooves of the other of said pair of grooved substrates so as to form photo-transmissible holes; and
   (g) cutting said joined body of said pair of grooved substrates to a width corresponding to a desired thickness of said photo-shield spacer plate along cutting lines perpendicular to said grooves.

4. In an image transmitting element comprising:
   a lens array plate comprising micro-lenses one-dimensionally or two-dimensionally formed as an array on a transparent substrate; and
   a transparent photo-shield spacer plate joined with said lens array plate on one surface thereof, said photo-shield spacer plate comprising an array of photo-transmissible holes formed therein each corresponding to said micro-lenses, respectively, at least a part or the whole of an inner wall of each of said photo-transmissible holes being a photo-absorptive surface, said photoshield spacer plate comprising a pair of members each having grooves each forming a longitudinally divided half of said respective photo-transmissible holes, said pair of members being joined and contact with each other so that said grooves of the other of said pair of members so as to form said photo-transmissible holes; a process for producing the photo-shield spacer plate comprising the steps of:

(a) providing one surface of each of a pair of substrates with an anti-corrosive mask film;

(b) forming an array of slit apertures in parallel to each other in said mask film;

(c) contacting an etching material with the surface of said substrate on which said mask film is provided to etch the surface of said substrate isotopically from said slit apertures to thereby form grooves each having a substantially semi-cylindrical shape;

(d) removing said mask film;

(e) forming a photo-absorptive coating on at least a part or the whole of an inner wall surface of each of said grooves;

(f) joining said pair of grooved substrates in a manner so that said grooves of one of said pair of grooved substrates are made to accord with said grooves of the other of said pair of grooved substrates so as to form photo-transmissible holes; and (g) cutting said joined body of said pair of grooved substrates to a width corresponding to a desired thickness of said photo-shield spacer plate along cutting lines perpendicular to said grooves.

* * * * *